Dec. 11, 1928.　　　　　　　　　　　　　　　　　1,695,021
S. R. PURYEAR
APPARATUS FOR SEPARATING SOLIDS
Filed April 17, 1926　　　3 Sheets-Sheet 1

INVENTOR
BY *Samuel R. Puryear*
ATTORNEY

Dec. 11, 1928.  S. R. PURYEAR  1,695,021
APPARATUS FOR SEPARATING SOLIDS
Filed April 17, 1926   3 Sheets-Sheet 2

INVENTOR
Samuel R. Puryear
ATTORNEY

Dec. 11, 1928.
S. R. PURYEAR
1,695,021
APPARATUS FOR SEPARATING SOLIDS
Filed April 17, 1926 3 Sheets-Sheet 3
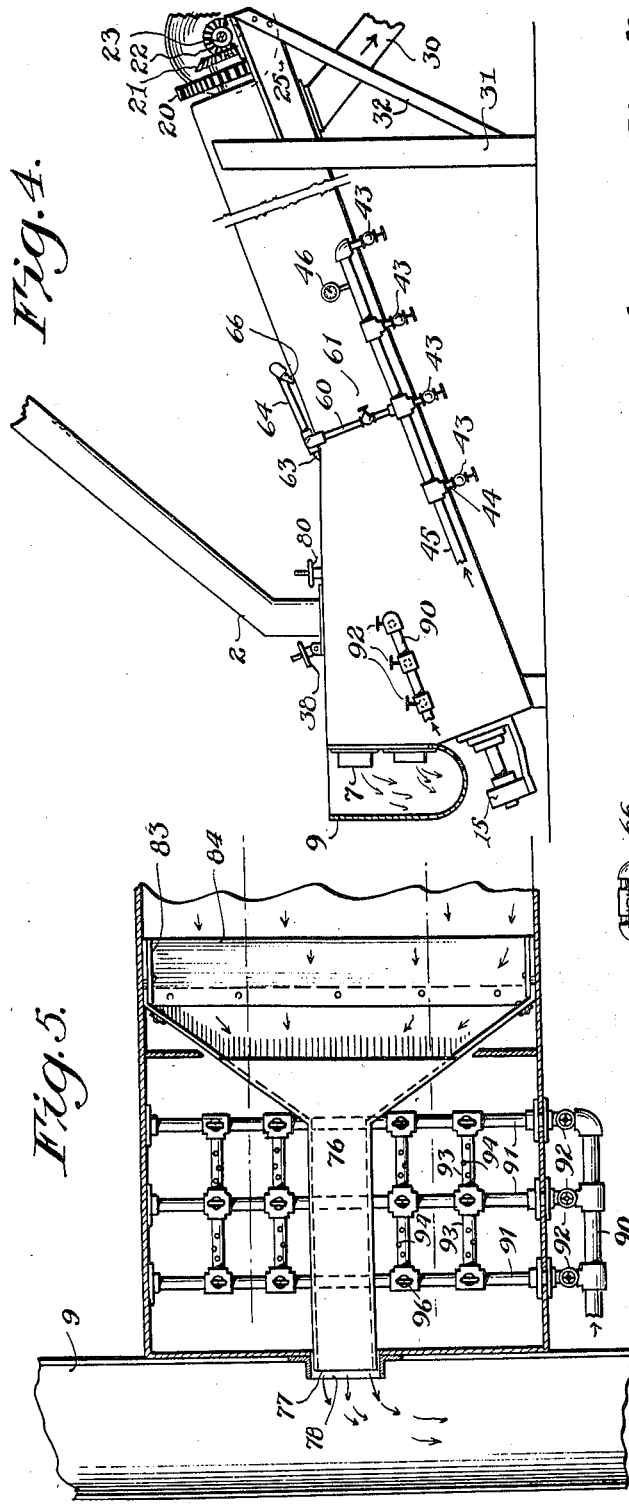
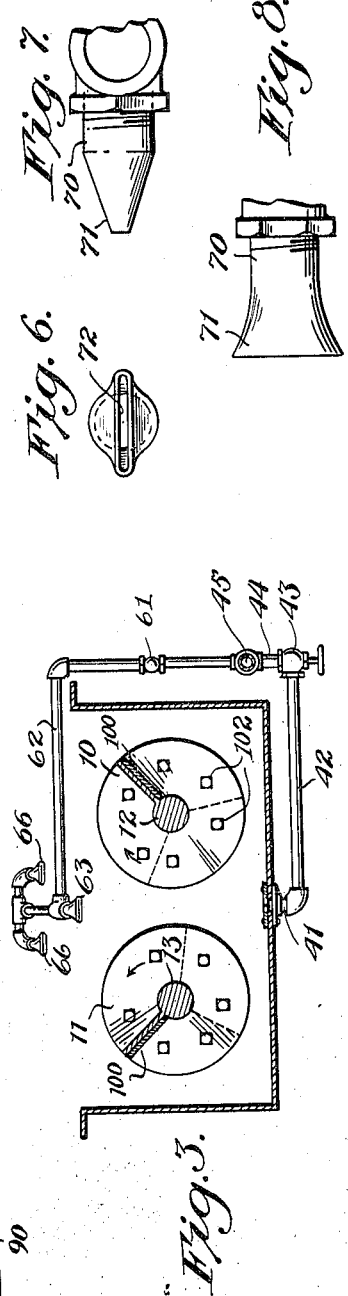
INVENTOR
Samuel R. Puryear
BY
ATTORNEY Patented Dec. 11, 1928.

1,695,021

UNITED STATES PATENT OFFICE.

SAMUEL R. PURYEAR, OF NASHVILLE, TENNESSEE.

APPARATUS FOR SEPARATING SOLIDS.

Application filed April 17, 1926. Serial No. 102,649.

This invention relates to apparatus for separating solids and has for its object to produce a mechanism of this character which will be simple in construction, comparatively inexpensive to manufacture, and more efficient in action than those heretofore proposed.

With these and other objects in view, the invention consists in the novel details of construction and combinations of parts more fully hereinafter disclosed and particularly pointed out in the claims.

Referring to the accompanying drawings, forming a part of this specification, in which like numerals designate like parts in all the views:—

Fig. 3 is a transverse sectional view taken on the line 3—3 of Fig. 2 and looking in the direction of the arrows;

Fig. 4 is a diagrammatic side elevational view illustrating the disposition of the water pipes associated with this apparatus;

Fig. 5 is a sectional view taken on the line 5—5 of Fig. 2 and looking in the direction of the arrows;

Figs. 6, 7 and 8 are respectively, an end view, a side view, and a plan view of one of the water nozzles employed in this invention;

Fig. 9 is a sectional view illustrating one of the flap valves in the bottom of this apparatus; and Fig. 10 is a perspective view of said valve.

This invention comprises an improvement over the apparatus disclosed in U. S. Letters Patent to Samuel R. Puryear, No. 1,400,980, granted December 20, 1921, wherein there is provided a battery of unitary conveyors adapted to move material upwardly while being washed in order to separate the solids from the liquid contents of the material.

Figure 2:
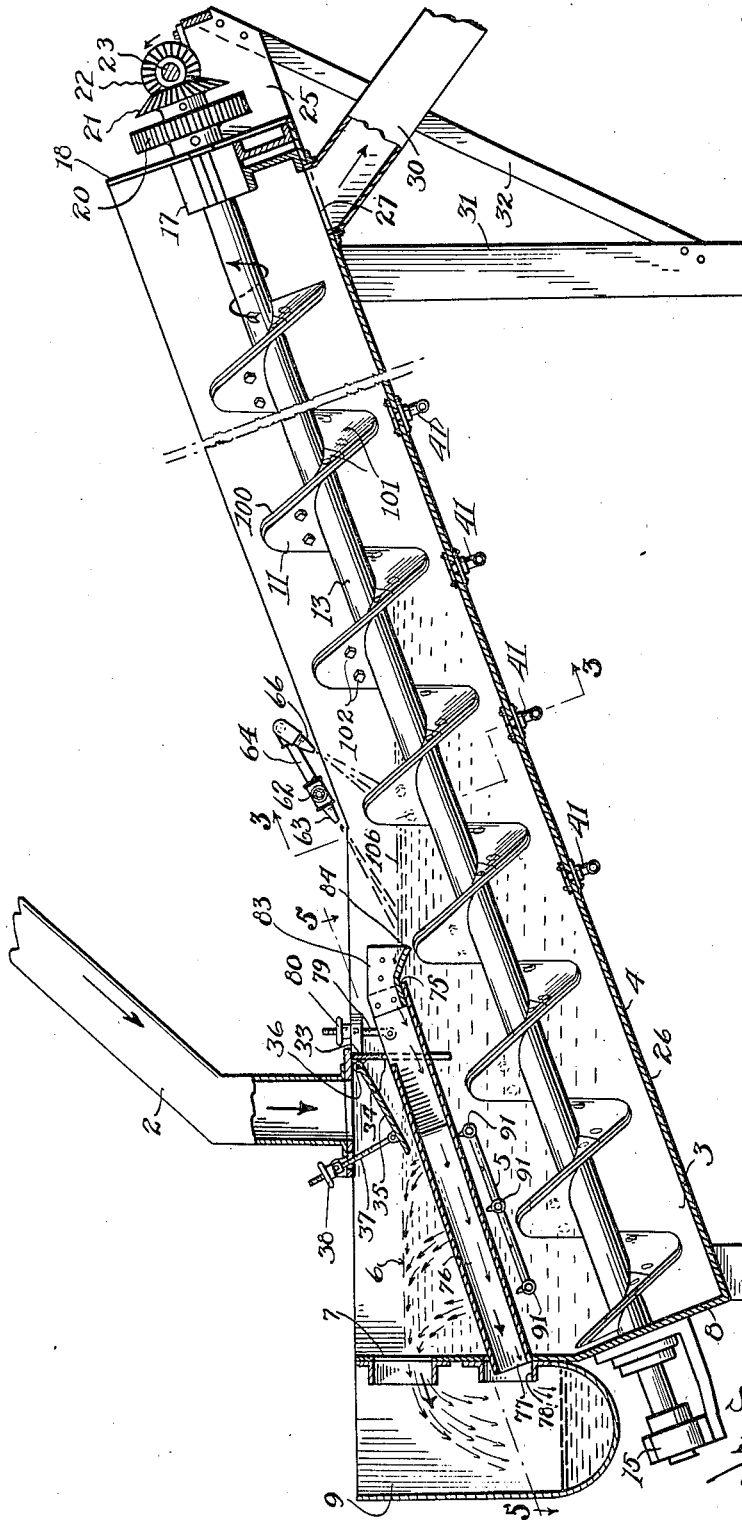
Fig. 2 is a longitudinal sectional view taken on the line 2—2 of Fig. 1 and looking in the direction of the arrows.

Referring to Fig. 2, the material to be worked is delivered to the apparatus with an excess of water through the chute 2 from which it emerges, and the solids fall by gravity into the lowermost end 3 constituting a receiving chamber, of the tank 4. During the process of settling in said chamber 3, the material descends through the water contained in said tank and is subjected to jets of water under relatively high pressure from the system of submerged sprayers generally indicated by the numeral 5. The looser and lighter material is thus forced by the action of the strong jets from the sprayers toward the level 6 of the water in said tank 4 and, due to the direction of said jets, the material is directed to and through the opening 7 in the end wall 8 of the tank 4, and into the discharge trough or sluiceway 9 adapted to convey the washings away from the apparatus. This movement of the washings by said jets from the tank 4 is aided by the material overflow of water, at level 6, through the opening 7.

The heavier material will be conducted from the lowermost end of the receiving chamber 3 by means of a pair of screw conveyors 10 and 11, the thread of one being right hand, and the thread of the other being left hand. These screws are mounted respectively on shafts 12 and 13, the lowermost end of each shaft passing through the end wall 8 of the tank 4 and being housed in a suitable thrust bearing generally indicated by the numeral 15. The shafts 12 and 13 are parallelly disposed both to each other and to the inclined bottom of the tank 4, and pass through suitable journals 16 and 17 respectively secured to said tank at the upper end 18 thereof. The shafts 12 and 13 extend beyond their upper journal bearings and on the extreme end of the shaft 12 and outside the tank there is secured the planary gear 19. The shaft 13 likewise extends beyond the tank 4 and has secured thereto the planary gear 20 smaller than and meshing with the gear 19. On the extreme end of said shaft is secured the bevel gear 21 adapted to mesh with a companion bevel gear 22, rigid with the main driving shaft 23 and by means of which power is transmitted to the said screws. The shaft 23 rotates in suitable bearings 24 secured to an extension 25 of the said walls of the tank 4. Thus it will be seen that the material deposited in the lowermost end 3 of the tank 4 may be moved upwardly along the inclined bottom 26 of said tank, and ultimately be ejected from said tank at the uppermost end 18 thereof by passing through the opening 27 in the bottom of said tank and into the delivery chute 30. Also it will be seen that the planary gears 19 and 20 being of different sizes will rotate the screws 10 and 11 at different speeds in different directions, with the result that the material moved by said screws will be broken up into smaller pieces during said movement. Stated in other words, the agglomerated material such, for example, as mud balls mixed with gravel, lignite, coal, shale, shells, etc., is divided and reduced by the action of these conveyers so that the larger and heavier of the ingredients of said material are carried by the conveyors to the delivery chutes 30. The end 18 of the tank 4 is held in elevated position by any suitable means such as the support 31 and the brace 32.

In order to facilitate the operation of this apparatus, there is provided a vertically disposed partition 33 adjacent the chute 2 and apertured as at 34 to accommodate an adjustable conduit 76. Further, there is provided an adjustable baffle plate 35 pivoted as at 36 to the partition 33 and adapted to be struck by the material descending through the chute 2. The position of this baffle 35 may be adjusted as by means of the threaded pin 37 loosely connected to the forward edge of said baffle and engaged by a hand wheel 38 for longitudinal movement in a manner well understood. It will thus be seen that the material will strike the baffle 35 and be deflected therefrom toward the left as seen in Fig. 2 so that, as the material starts to go downwardly through the water, in the receiving chamber 3, said material will be acted upon by the water jetted from the spraying apparatus 5. It is to be noted that said spraying apparatus is disposed in a plane substantially parallel to the inclined bottom of the tank 4 whereby a better action is had upon the material directed from the baffle 35. The arrows clearly indicate the action of the jets upon the material.

As the material passes upwardly in the tank 4 due to the action of the screws 10 and 11 it will be observed that the material will be forced toward the center of the tank by the action of said screws. Therefore in the bottom 26 of the tank and intermediate the screws 10 and 11 there is provided a plurality of openings 40 each associated with a nipple 41 connected to a length of piping 42 leading beneath the tank to a valve 43 connected as by a second nipple 44 to the main water pipe line 45, see Figs. 2, 3, 4 and 9. At any suitable point in the main pipe line 45 there is provided a suitable pressure gauge 46. Within the tank 4 and over each opening 40, there is placed a flap valve generally indicated by the numeral 50 and particularly illustrated in Figs. 9 and 10. This flap valve consists of a substantially rectangular piece of flexible material such as leather or rubber, provided with suitable apertures 51 in the corners thereof to receive bolts 52 by means of which the valve is secured to the bottom 26 of the tank. These bolts 52 serve the additional purpose of securing the collar 53, and the nipple 41 threaded thereto, to said tank bottom it being understood of course that the entire connection comprising the said nipple, collar, and the flap valve 50 will be water-tight. The flap valve is further provided with intersecting slits 55 forming a plurality of pointed flaps 56 indicated by the dashed lines in said Figs. 9 and 10. By this construction it will readily be seen that the water under pressure from the main line 45 will pass through each valve 43, through each length of pipe 42 and each nipple 41, and through each opening 40 in the bottom 26 of the tank, thus forcing the pointed flaps 56 of each flap valve 50 upwardly as indicated by the dotted lines in Fig. 9 whereby the water may gain entrance to within the tank 4, but the flap valves will prevent the material on the bottom of said tank from passing down into the nipples 41. The pressure of the water is sufficient to act upon the material above each flap valve and presented thereto by the screws, so that the lighter and looser materials will be forced upwardly to the level 106 of the water in the tank 4, thus constituting a second washing of material.

With reference to Figures 1, 2, 3 and 4 it will be observed that there is also connected to the pipe line 45, a short length of piping 60, having a valve 61 therein, which connects at its upper end with a laterally extending pipe 62 terminating above and at substantially the longitudinal center of the apparatus where there is provided a T 162. To one end of the T 162 is secured a spraying nozzle 63 and to the other end of the T is secured a short length of pipe 64 provided at its end with duplicate laterally and oppositely extending branches 65 having at each end thereof a spraying nozzle 66 in all respects similar to the spraying nozzle 63. These nozzles are illustrated in detail in Figures 6, 7 and 8, wherein it will be observed that the said nozzle comprises a nipple 70 threaded at one end to engage with the pipe to which it is secured, and flattened at the other end as at 71 to provide the thin flat opening 72 through which the water will emerge in a flat fan-like spray.

The lower nozzle 63 is so disposed as to eject the water therefrom downwardly toward the level 106 of the liquid in the tank in a plane substantially parallel with the screws 10 and 11 as clearly indicated in Fig. 2, whereas the other nozzles 66 are more downwardly inclined so that the water directed therefrom toward the water level in said tank will strike the material thrown upwardly by the screws and the water coming through the flap valves 50 from the bottom 26 of the tank 4. This opposed action is such that the lighter material will be forced to the left as seen in Fig. 2 to be acted upon by the water from the nozzle 63 with the result that said lighter materials will be flushed along the surface 106 of the liquid in the intermediate portion of the tank 4 toward and over the adjustable wier 75, see Fig. 2, whereupon said material may escape from the apparatus as by means of the flat funnel shaped conduit 76, whose lowermost end 77 is disposed within the opening 78 in the lower end wall 8 of the tank 4, and the discharge trough or sluice-way 9 as clearly shown in the drawings. In this connection it will be observed that the partition 33 extending into the liquid in the tank makes possible two liquid levels, that is to say, the level 6 between the partition and the sluice-way and associated with the receiving chamber 3, and the level 106 between the said partition and the discharge chute 30 and associated with the chamber where the material receives the second washing. The lower edge of the inner end of the conduit 76 forms the wier 75 and it is this said end of the conduit that is flared out, providing a mouth extending across the full width of the tank 4, and that is made vertically adjustable as by means of the threaded bolts 79, secured to said conduit, and actuated by the hand wheels 80 in a manner well understood. The wier 75 has associated therewith a flexible apron 83, preferably made of rubber, rigidly secured thereto, but having a free unsupported forward edge 84 which is adapted to hang downwardly below the liquid level 106 so as to insure the lighter material washed by the nozzles 63 and 66 being caught thereby and directed into the wide open mouth of the funnel like conduit 76.

Figure 1:
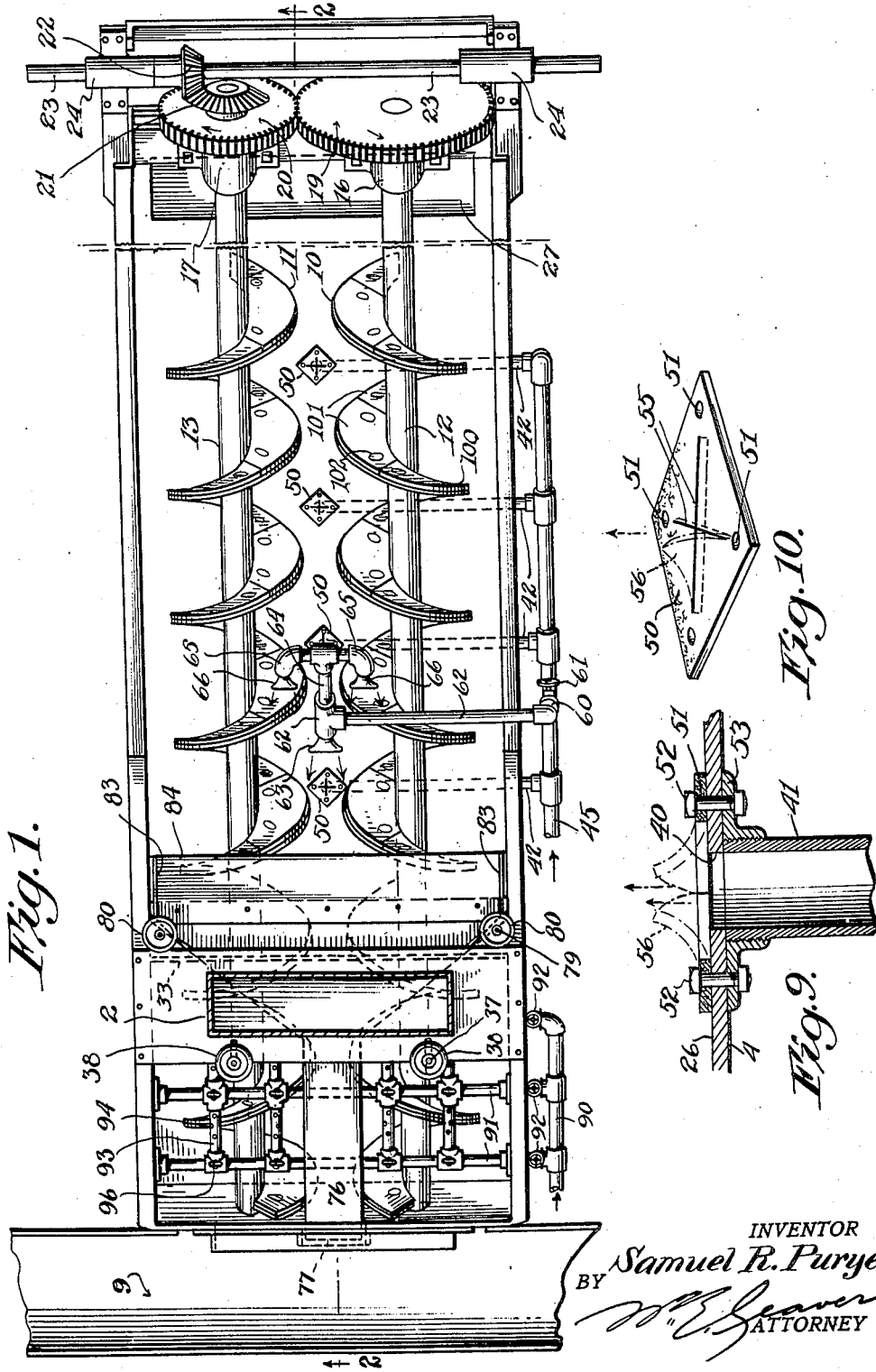
Fig. 1 is a plan view of an apparatus made in accordance with this invention.

With particular reference to Figs. 1, 2 and 5 the spraying apparatus 5 is shown as consisting of a main water pipe 90 located outside the tank 4 and having connected thereto a plurality of lateral pipes 91 passing through one side wall of the tank 4, and extending clear across said tank. The extreme ends of these pipes 91 are closed and secured to the opposite side of said tank. A suitable valve 92 is provided in each lateral exteriorly of the tank, and all of said laterals 91 are provided with suitable connections comprising T's and crosses for intermediate piping 93 disposed longitudinally of the tank 4. This piping 93 is provided on its uppermost side with a plurality of drilled apertures to permit water to be jetted upwardly through said apertures. Further, each T and cross connection is provided on its upper side with a spraying nozzle 96 flattened and in all respects similar to the spraying nozzles 63 and 66 whereby, as will be readily seen in Fig. 2, the lighter material is forced upwardly in the receiving chamber 3 of the tank as the heavier material descends. The said lighter material reaches the level 6 of the liquid and is then flushed through the opening 7 into the sluice-way 9, being aided in this movement by the water deflected from the baffle plate 35.

The screws 10 and 11 receive a great deal of wear in practice, and especially on the upper or pushing surfaces thereof. Therefore it has been found not only practicable but very desirable to cover the metal screw, which is rigid with its shaft, with a sheathing or protective plating, and in order that said plating, generally indicated by the numeral 100, may be easily removed when worn and replaced, it is made in a plurality of sections as indicated by the numeral 101. In other words, the plating 100 comprises a plurality of sections 101, there being for example, three of these sections provided for each complete thread of the screw. The sections are secured to the blades of the screw in any suitable manner such as by the bolts 102.

From what has been thus far described it will be seen that material is fed to the apparatus through the delivery chute 2 and that the baffle 35 deflects the fed material so that it will be directed to the left as seen in Figure 2 by the water jets from the spraying apparatus 5. It will also be obvious that the solids in the fed material will pass to the bottom of the receiving chamber 3, there to be acted upon by the oppositely rotating screws 10 and 11, moving at different speeds, whereby the material is divided and reduced in size as well as moved upwardly along the bottom 26 of each unit until the material is finally worked into the delivery chutes 30. During this movement of the material, the same is thoroughly washed.

The particular arrangement of the water pipes as well as the arrangement and operation of the screw conveyors acts upon the material in a novel way, however. That is to say, an apparatus of this character is well adapted for use on dredges where the material is brought from the bottom of the river or harbor and is desired to be separated. The material which is obtained from the bottom of the river, for example, contains a great deal of mud, and such other materials as lignite, coal, shale, shells, etc., and of course a great deal of water. This material as it comes up from the bottom is deposited in a suitable receptacle or bin, not shown, from which it passes to the separator, through the chute 2. By employing an apparatus of this type, it will therefore be seen that there is practically a continuity of operation, and ease of handling, by which an extra tonnage of recovered material is obtained. Also, due to the fact that aparatus of this type may be easily installed on barges or boats, the system employed in this invention of washing the material may be used at the minimum expense. Another feature of this invention lies in the employment of the adjustable weir 75 whereby differences in the liquid levels 6 and 106 may be compensated for due to the changes in elevation of the barge or boat on which this apparatus is mounted. In this case, such a difference may be compensated for by adjusting either or both of these weirs.

From the foregoing it will therefore be seen that there is employed in this apparatus a passage comprising the chute 2, the receiving chamber 3, aperture 7, and the sluiceway 9, said passage being adapted for liquids and solids. Further this passage is provided with a depression formed by the lower end of the bottom 26 of the unit and the end partition 8 thereof, in order to facilitate the settling of solids suspended in the liquids passing through said passage. Further the baffle 35 may be adjusted to various positions to direct the material falling through the chute 2 in different directions into the receiving chamber 3. That is to say, it will be desirable under certain conditions to allow the material delivered to the receiving chamber to fall as precipitiously as possible, whereas under other conditions it will be desirable to have the material delivered to the receiving chamber 3 in more of a horizontal direction so that it will receive better action by the submerged jets from the spraying apparatus 5 as will be evident to those familiar with this type of apparatus. Thus it will be seen that there is provided in the spraying apparatus 5 a submerged fluid pressure means, hydraulic or otherwise, to act upon the material delivered to the receiving chamber to remove some of the solids therefrom during the washing of all of the material. These lighter solids having the lowest specific gravity, will be forced by the upwardly directed jets to the surface of the liquid in the receiving chamber and thence be forced through the aperture 7 into the sluiceway 9. During this operation, water will of course be going down through the chute 2 with the material and thus the receiving chamber will be filled not only by said water but also by the additional supply of liquid from the spraying apparatus 5.

There is a second passage comprising the portion of the tank 4 to the right of the receiving chamber 3, (or in other words, that portion of the tank to the right of the partition 33 as seen in Figure 2), the substantially funnel shaped conduit 76, and the sluiceway 9, likewise adapted for liquids and solids. This passage provides a means, in the conduit 76, which passes through the receiving chamber 3 so that the liquids and solids in said passage are out of contact with the material in the receiving chamber. There is also associated with this second liquid passage a washing chamber which comprises the substantially central portion of the apparatus as viewed in Figure 2 and the water jets supplied through the flap valves 50 in the bottom 26 of the tank 4, and the jets from the nozzles 63 and 66 disposed above the liquid level 106 of the water in said chamber. The forward edge 75 of the conduit 76 together with the apron 83 may be adjusted as by the hand wheel mechanism to different levels to better facilitate the removal of the other of said solids from the material from the receiving chamber 3 or those solids having a higher specific gravity than those forced through the previously named passage. This is made possible by the screws 10 and 11 which move the material which has settled in the depression in the receiving chamber 3 up the inclined bottom 26 to and through the washing chamber where said material is acted upon by the jets through the flap valves 50 in said bottom. These jets force the lighter of the solids of said material upwardly to the liquid level 106 of the washing chamber where they will be forced toward the left as seen in Figure 2 along said liquid level, and into the open mouth of the conduit 76 from which they may escape by gravity to the sluiceway 9 all as clearly indicated by the arrows in said figure. It is to be observed that the screws 10 and 11 are adapted to rotate in opposite directions and that said directions, as seen in Figure 3, are such as will tend to move the material from the sides of the tank 4 to the longitudinal central portion thereof where said material will be acted upon by the strong water jets through the flap valves 50. Thus there is a mechanical as well as fluid pressure means to aid in forcing the lighter solids up and out of the washing chamber into the conduit 76. It is also to be observed that the screws 10 and 11 each rotate at different speeds with the result that the larger masses of material, such as mud balls, clay, etc. will be broken up into smaller subdivision while being moved to and through the washing chamber. Lastly, it will be observed that the screws 10 and 11 are of such lengths and the tank 4 is of such inclination that the material after undergoing the second washing will be moved by said screws above the liquid levels 6 and 106 before reaching the delivery chute 30 with a result that substantially all of the water or other liquid will have been drawn from the material before the material enters the delivery chute 30. Thus there is provided means in this apparatus comprising the upper extermity of the tank 4 and the delivery chute, to recover the remaining solids in relatively dried condition.

Lastly, it is to be observed that the screws 10 and 11 would normally receive great wear from the continuous abrasive action by the material which they move, and that the most of said action would be on the upper or advancing surfaces of said screws. Inasmuch as these screw conveyors are quite costly to manufacture it has been found very practicable to prevent the wear of the metallic threads of these screws and thus save the cost of replacement, by applying to the advancing surfaces thereof a protective plate generally indicated by the numeral 100 which is made in sections 101 adapted to be secured as by the bolts 102 to the threads of the screws. These sections 101 are made of convenient dimensions so that they can be removed and replaced without removing the entire screw conveyor from the tank. Thus it will be seen that there is provided in this apparatus means to prevent the material moving means from undue wear while moving said material, and that these preventive means are readily replaceable and sectional.

Various valves in the fluid pressure supply, will enable different and varied pressures of fluid jetted upon the solids being separated, all as will be readily understood. Therefore the fluid pressure used in this apparatus may be varied in accordance with the requirements of the material being separated.

It is obvious that those skilled in the art may vary the details of construction as well as the arrangement of parts without departing from the spirit of the invention, and therefore it is not desirous to be limited to the above disclosure except as may be required by the claims.

What is claimed is:—

1. In an apparatus of the class described the combination of a passage adapted for liquids and solids and including a receiving chamber; a second passage including a washing chamber and a conductor passing through the receiving chamber; means to reduce the size of said solids while moving said material from said receiving chamber to and through said washing chamber; submerged means to force some solids into said first named passage; means to force other solids into said second named passage; and means to recover the remaining solids in relatively dry condition.

2. In an apparatus of the class described the combination of a passage adapted for liquids and solids and including a receiving chamber; a second passage including a washing chamber and a conductor passing through the receiving chamber; rotating and coacting means of different speeds to reduce the size of said solids while moving said material from said receiving chamber to and through said washing chamber; submerged means to force some solids into said first named passage; means to force other solids into said second named passage; and means to recover the remaining solids in relatively dry condition.

3. In an apparatus of the class described the combination of a passage adapted for liquids and solids and including a receiving chamber; a second passage passing through said receiving chamber adapted for liquids and solids and including a washing chamber; oppositely rotating means comprising continuous screws of differing speeds coacting to reduce the size of said solids while moving said material from said receiving chamber to and through said washing chamber; submerged means to force some solids into said first named passage; means to force other solids into said second named passage; and means to recover the remaining solids in relatively dry condition.

4. In an apparatus of the class described the combination of a passage adapted for liquids and solids and including a receiving chamber; a second passage including a washing chamber and a conductor passing through the receiving chamber; means to reduce the size of said solids while moving said material from said receiving chamber to and through said washing chamber; submerged means coacting with an elevated means to force some solids into said first named passage; means to force other solids into said second named passage; and means to recover the remaining solids in relatively dry condition.

5. In an apparatus of the class described the combination of a passage adapted for liquids and solids and including a receiving chamber; a second passage including a washing chamber and a conductor passing through the receiving chamber; means to reduce the size of said solids while moving said material from said receiving chamber to and through said washing chamber; submerged means to force some solids into said first named passage; submerged and elevated means to force other solids into said second named passage; and means to recover the remaining solids in relatively dry condition.

6. In an apparatus of the class described the combination of a passage adapted for liquids and solids and including a receiving chamber; a second passage including a washing chamber and a conductor passing through the receiving chamber; means to reduce the size of said solids while moving said material from said receiving chamber to and through said washing chamber; submerged means coacting with an adjustable elevated means to force some solids into said first named passage; submerged and elevated means independent of said last named means but likewise coacting to force other solids into said second named passage; and means to recover the remaining solids in relatively dry condition.

7. In an apparatus of the class described the combination of an inclined tank whose lowermost end constitutes a receiving chamber; a chute adapted to deliver material comprising a mixture of solids and a liquid to said chamber; means disposed in said chamber to remove some of the solids from said material while washing the same; means disposed out of said chamber to separate while washing other of said solids from said material; coacting means to subdivide said material while moving the same to and through said last named washing chamber from said receiving chamber; means to pass the second washings through said receiving chamber out of contact with the material therein; and means to receive the washed remaining solids.

8. In an apparatus of the class described the combination of an inclined tank whose lowermost end constitutes a receiving chamber; a chute adapted to deliver material comprising a mixture of solids and a liquid to said chamber; a hydraulic means disposed in said chamber to remove some of the solids from said material while washing the same; hydraulic means disposed out of said chamber to separate while washing other of said solids from said material; coacting means to subdivide said material while moving the same to and through said last named washing chamber from said receiving chamber; means to pass the second washings through said receiving chamber out of contact with the material therein; and means to receive the washed remaining solids.

9. In an apparatus of the class described the combination of an inclined tank whose lowermost end constitutes a receiving chamber; a chute adapted to deliver material comprising a mixture of solids and a liquid to said chamber; hydraulic means comprising a plurality of upwardly directed water jets disposed in said chamber to remove some of the solids from said material while washing the same; hydraulic means comprising a plurality of upwardly and downwardly directed water jets disposed out of said chamber to separate while washing other of said solids from said material; coacting means to subdivide said material while moving the same to and through said receiving chamber; means to pass the second washings through said receiving chamber out of contact with the material therein; and means to receive the washed remaining solids.

10. In an apparatus of the class described the combination of an inclined tank whose lowermost end constitutes a receiving chamber; a chute adapted to deliver material comprising a mixture of solids and a liquid to said chamber; means disposed in said chamber to remove some of the solids from said material while washing the same; means disposed out of said chamber to separate while washing other of said solids from said material; coacting means rotating at different speeds to subdivide said material while moving the same to and through said last named washing chamber from said receiving chamber; means to pass the second washings through said receiving chamber out of contact with the material therein; and means to receive the washed remaining solids.

11. In an apparatus of the class described the combination of an inclined tank whose lowermost end constitutes a receiving chamber; a chute adapted to deliver material comprising a mixture of solids and a liquid to said chamber; means disposed in said chamber to remove some of the solids from said material while washing the same; means disposed out of said chamber to separate while washing other of said solids from said material; coacting means comprising a pair of screws rotating at different speeds to subdivide said material while moving the same to and through said last named washing chamber from said receiving chamber; means to pass the second washing through said receiving chamber out of contact with the material therein; and means to receive the washed remaining solids.

12. In an apparatus of the class described the combination of an inclined tank whose lowermost end constitutes a receiving chamber; a chute adapted to deliver material comprising a mixture of solids and a liquid to said chamber; means disposed in said chamber to remove some of the solids from said material while washing the same; means disposed out of said chamber to separate while washing other of said solids from said material; coacting means comprising a pair of parallelly disposed screws rotating in opposite directions at different speeds to subdivide said material while moving the same to and through said last named washing chamber from said receiving chamber; means to pass the second washings through said receiving chamber out of contact with the material therein; and means to receive the washed remaining solids.

13. In an apparatus of the class described the combination of an inclined tank whose lowermost end constitutes a receiving chamber; a chute adapted to deliver material comprising a mixture of solids and a liquid to said chamber; means disposed in said chamber to remove some of the solids from said material while washing the same; means disposed out of said chamber to separate while while washing other of said solids from said material; coacting means to subdivide said material while moving the same to and through said last named washing chamber from said receiving chamber; means to prevent said last named means from undue wear while so acting; means to pass the second washings through said receiving chamber out of contact with the material therein; and means to receive the washed remaining solids.

14. In an apparatus of the class described the combination of an inclined tank whose lowermost end constitutes a receiving chamber; a chute adapted to deliver material comprising a mixture of solids and a liquid to said chamber; means disposed in said chamber to remove some of the solids from said material while washing the same; means disposed out of said chamber to separate while washing other of said solids from said material; coacting means to subdivide said material while moving the same to and through said last named washing chamber from said receiving chamber; readily replaceable sectional means to prevent said last named means from undue wear while so acting; means to pass the second washings through said receiving chamber out of contact with the material therein; and means to receive the washed remaining solids.

15. In an apparatus of the class described the combination of an inclined tank whose lowermost end constitutes a receiving chamber; a chute adapted to deliver material comprising a mixture of solids and a liquid to said chamber; means disposed in said chamber to remove some of the solids from said material while washing the same; means disposed out of said chamber to separate while washing other of said solids from said material; coacting means to subdivide said material while moving the same to and through said last named washing chamber from said receiving chamber; adjustable unrestricted means to pass the second washings through said receiving chamber out of contact with the material therein; and means to receive the washed remaining solids.

16. In an apparatus of the class described the combination of an inclined tank whose lowermost end constitutes a receiving chamber; a chute adapted to deliver material comprising a mixture of solids and a liquid to said chamber; means disposed in said chamber to remove some of the solids from said material while washing the same; means disposed out of said chamber to separate while washing other of said solids from said material; coacting means to subdivide said material while moving the same to and through said last named washing chamber from said receiving chamber; adjustable unrestricted means coacting with said last named means to pass the second washings through said receiving chamber out of contact with the material therein; and means to receive the washed remaining solids.

17. In an apparatus of the class described, the combination of a liquid passage provided with a depression adapted to facilitate the settling of solids suspended in said liquid; means adapted to force through said passage solids having the lowest specific gravity; a second liquid passage separate from said first mentioned passage but passing therethrough; means adapted to force through said second passage solids having a higher specific gravity than those forced through said first named passage; a plurality of screws adapted to move the solids from said depression and convey them above the normal liquid levels in said passages; means adapted to prevent solids other than those having the highest specific gravity from being conveyed above the normal liquid levels in said passages; and means to receive the solids conveyed above said liquid levels by said screws.

18. In an apparatus of the class described, the combination of a liquid passage provided with a depression adapted to facilitate the settling of solids suspended in said liquid; fluid pressure means adapted to force through said passage solids having the lowest specific gravity; a second liquid passage separate from said first mentioned passage but passing therethrough; fluid pressure means adapted to force through said second passage solids having a higher specific gravity than those forced through said first named passage; a plurality of screws adapted to move the solids from said depression and convey them above the normal liquid levels in said passages; fluid pressure means adapted to prevent solids other than those having the highest specific gravity from being conveyed above the normal liquid levels in said passages; and means to receive the solids conveyed above said liquid levels by said screws.

19. In an apparatus of the class described, a combination of a liquid passage provided with a depression adapted to facilitate settling of solids suspended in said liquid; means adapted to force through said passage solids having the lowest specific gravity; a second liquid passage separate from said first mentioned passage but passing therethrough; means adapted to force through said second passage solids having a higher specific gravity than those forced through said first named passage; a plurality of oppositely rotating screws adapted to move the solids from said depression, break up the larger ones, and convey them above the normal liquid levels in said passages; means adapted to prevent solids other than those having the highest specific gravity from being conveyed above the normal liquid levels in said passages; and means to receive the solids conveyed above said liquid levels by said screws.

20. In an apparatus of the class described, the combination of a liquid passage provided with a depression adapted to facilitate the settling of solids suspended in said liquid; means adapted to force through said passage solids having the lowest specific gravity; a second liquid passage separate from said first mentioned passage but passing therethrough; means adapted to force through said second passage solids having a higher specific gravity than those forced through said first named passage; a plurality of oppositely rotating screws rotating at different speeds adapted to move the solids from said depression, break up the larger ones, and convey them above the normal liquid levels in said passages; means adapted to prevent solids other than those having the highest specific gravity from being conveyed above the normal liquid levels in said passages; and means to receive the solids conveyed above said liquid levels by said screws.

21. In an apparatus of the class described the combination of a passage adapted for liquids and solids and including a receiving chamber having a normal liquid level; a second passage including a washing chamber and a conductor passing through the receiving chamber below said level; screw means extending above said level to reduce the size of said solids while moving said material from said receiving chamber to and through said washing chamber; submerged means to force some solids into said first named passage; means to force other solids into said second named passage; and means associated with said screw above said level to recover the remaining solids in relatively dry condition.

In testimony whereof I affix my signature.

SAMUEL R. PURYEAR.